Reissued Nov. 19, 1929 Re. 17,494

UNITED STATES PATENT OFFICE

HENRY R. POWER, OF NIAGARA FALLS, NEW YORK, ASSIGNOR, BY MESNE ASSIGNMENTS, TO MINNESOTA MINING & MANUFACTURING COMPANY, OF ST. PAUL, MINNESOTA, A CORPORATION OF MINNESOTA

WATERPROOF ABRASIVE

No Drawing. Original No. 1,615,231, dated January 25, 1927, Serial No. 646,959, filed June 21, 1923. Application for reissue filed November 9, 1927. Serial No. 232,189.

My invention relates to waterproof abrasives, and particularly to the waterproofing of abrasive paper and cloth.

Abrasive paper or cloth is ordinarily made by applying a coating of hot adhesive, such as hide glue, bone glue, or vegetable glue, to the surface of the backing, then running on a stream of abrasive grain, and allowing the product to cool. The ordinary adhesives in use for this purpose are not waterproof and do not permit of the efficient use of the abrasive paper with water which is required in the process of rubbing certain kinds of varnish finish. The water loosens the grain from the paper and materially shortens its life.

I provide an abrasive product comprising a flexible backing and abrasive grains attached thereto by a binder, the outer surface of which may be a cellulosic material such, for example, as a nitro-cellulose composition.

In carrying out my invention, I may apply the ordinary glue, which is water soluble, and an abrasive grain, which may be carborundum, emery, garnet, sand, or the like, in the usual manner, and allow them to set. After this operation I spray or flow the waterproofing compound on both the face and the back of the brasive paper or cloth. The waterproofing substance is preferably pyroxylin dissolved in a proper solvent, such as an acetate like butyl actate, with or without other acetates, an alcohol like ethyl alcohol, with or without other alcohols, ketones, like acetone, methyl ketone, or acetone oils, benzol, and camphor. I find it possible to use in the solution of nitro-cellulose a resin, (so-called gum, or gum-resin), such as copal or damar. The solution mentioned may vary within wide limits, and should be adjusted as to its boiling point to prevent too rapid evaporation of the film and to prevent absorption of water which may weaken the film before it is set.

In order to get a form of nitro-cellulose which can be used in solution and possess properties essential for operation on a production basis, such as even flowing or spreading on the backing used, there must be a certain balance of high, medium, and low boiling solvents to obtain the proper rate of evaporation. To get the resin, like damar, into solution, and the nitro-cellulose into solution, the lower boiling solvents, such as ethyl alcohol, acetone, and an acetate are used. To prevent too rapid evaporation and thus provide for the proper flow of the material, additional solvents of relatively higher boiling points, such as butyl and amyl acetates, the higher boiling alcohols, and certain ketones are used. Low evaporation rate, produced by higher boiling solvents prevents cooling of the surrounding air and the consequent condensation of water on the lacquer surface. This in turn prevents precipitation of the nitro-cellulose. Thus the important adjustment of the solution to the proper boiling point is secured.

Benzol is used as a diluent and also as a solvent for the resins used because of its comparatively low cost. It functions to reduce the viscosity of the nitro-cellulose solution containing resins so that it is easier to manipulate in the abrasive coating process.

Camphor constitutes a plasticizer or softener. The function of such a plasticizer or softener is to make the resulting film tough, elastic, flexible, adhesive and permanent.

The function of the resin is to give adhesion, body and hardiness to the coating and to render the coating more impervious to moisture. This increase in the hardness of the film is a very desirable feature in producing a good abrasive paper because the abrasive grains on the paper undergo very severe service in the art of rubbing or grinding the materials on which they are being worked, and by increasing the hardness of the film the grains are more firmly held in place and stick on to the backing longer and more securely so that the life of the abrasive article is increased. The resin also increases the body of the coating material without increasing the viscosity thereof, and this is highly desirable. Being cheaper than nitro-cellulose, many resins tend to reduce the cost. In increasing the hardness by the use of a resin, there is a tendency to brittleness, and to offset this and secure plasticity is one of the functions of the plasticizer, such as camphor.

On the evaporation of the solvent from the abrasive product, a thin transparent film is left which protects the adhesive from the action of water, even under very severe conditions.

Another method of carrying out the invention is to apply the nitro-cellulose solution to the paper or cloth backing in the same manner as the glue is commonly applied, and then flow the abrasive grain thereon. The product is then run over or under steam pipes in an enclosure until the volatile vapors evaporate and the film has set. The enclosure is arranged with proper facilities for collecting the volatile vapors which are recovered.

The film of abrasive and adhesive on the paper or cloth may then be put into use or sized with a thin pyroxylin solution to hold the grains more firmly in place. I provide an abrasive which is resistant to the action of water and which may be used under very severe conditions.

It will be noted that in either case, there is an outer coating of nitro-cellulose which not only serves to waterproof the abrasive product, but is also effective for assisting to secure the grains in place.

The word "fabric" is used in the claims to designate a flexible backing of paper or cloth, such as is employed in the manufacture of sandpaper or sandcloth.

While I have described a preferred embodiment of my invention, it will be understood that it is not limited thereto but may be otherwise embodied within the scope of the following claims.

I claim:

1. An abrasive product comprising a flexible backing having an abrasive material attached thereto by a glue, and a coating of a nitro-cellulose composition containing a modifying agent applied thereto.

2. An abrasive product comprising a flexible backing having an abrasive material attached thereto by a glue, and a heat-solidified cellulosic composition.

In testimony whereof, I have hereunto signed my name.

HENRY R. POWER.